United States Patent [19]
Hollander

[11] Patent Number: 5,169,317
[45] Date of Patent: Dec. 8, 1992

[54] EDUCATIONAL TOY

[76] Inventor: Leonard Hollander, 120 Wellington Ct., Staten Island, N.Y. 10314

[21] Appl. No.: 617,645

[22] Filed: Nov. 26, 1990

[51] Int. Cl.⁵ .................. G09B 1/00; G09B 19/00; A63H 29/08
[52] U.S. Cl. .................................. 434/208; 446/168
[58] Field of Search ............. 434/203, 204, 207, 208, 434/104, 98; 446/168

[56] References Cited

U.S. PATENT DOCUMENTS

| | | | |
|---|---|---|---|
| D. 233,522 | 11/1974 | Majewski | 434/208 |
| 1,329,850 | 2/1920 | Pye . | |
| 2,205,936 | 6/1940 | Sullivan | 446/168 |
| 2,543,380 | 2/1951 | Rivers . | |
| 2,670,206 | 2/1954 | Brewster | 446/168 |
| 2,946,135 | 7/1960 | Eickmeyer . | |
| 3,127,686 | 4/1964 | Goldfarb | 434/208 |
| 3,400,472 | 9/1968 | Strnad | 434/208 |
| 3,453,748 | 7/1969 | Miller | 434/207 |
| 3,864,850 | 2/1975 | Weimecke | 434/208 |
| 4,772,240 | 9/1988 | Boskovic . | |

FOREIGN PATENT DOCUMENTS 142479 12/1930 Switzerland .................. 446/168

*Primary Examiner*—Gene Mancene
*Assistant Examiner*—Cindy A. Cherichetti
*Attorney, Agent, or Firm*—Fisher, Christen & Sabol

[57] ABSTRACT

The educational toy of the present invention comprises a base and transparent tubular members attached to the base arranged in a generally parallel relationship to each other. The output end of each tubular member is lower than the input end of each tubular member so that balls inserted in the input end flow to the output end. Removable means are provided at the output ends for retaining the balls within the tubular members. Insertion and removal of balls from the tubes by the user improves hand-eye coordination. The toy is useful in teaching left/right, up/down, and part-whole relationships. The device teaches movement, counting, and color awareness.

20 Claims, 1 Drawing Sheet

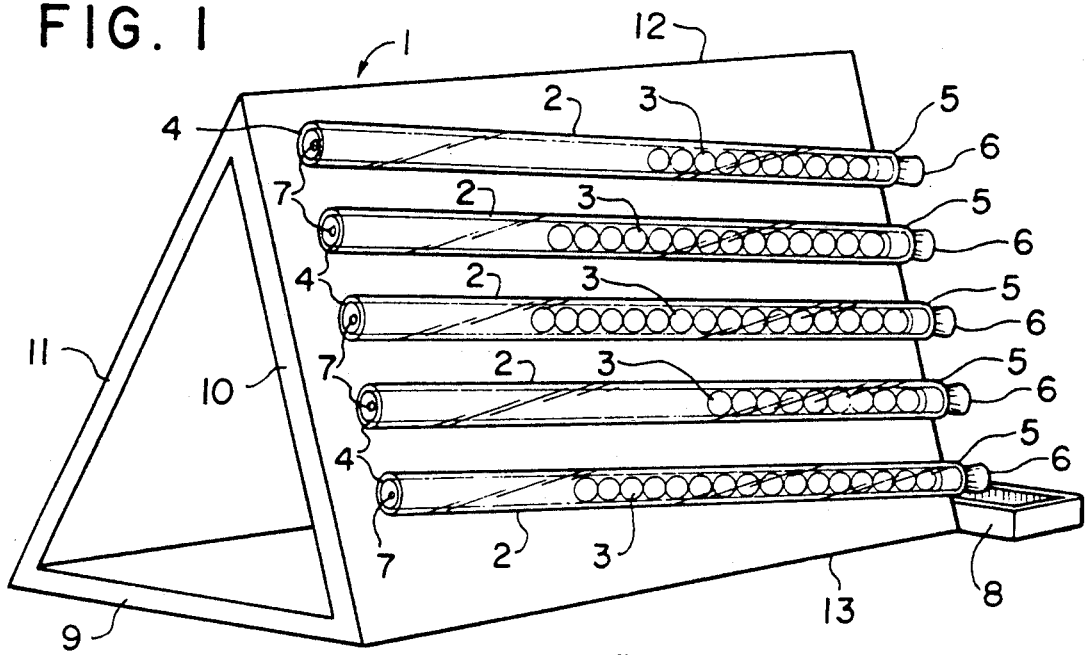
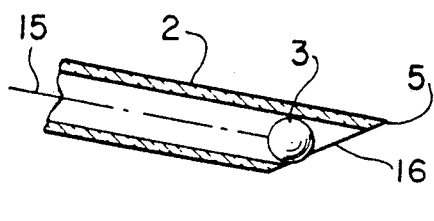 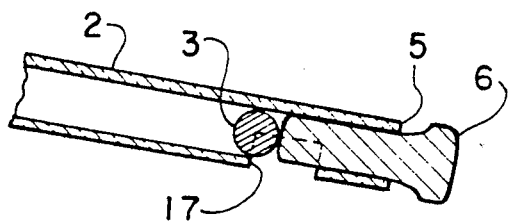
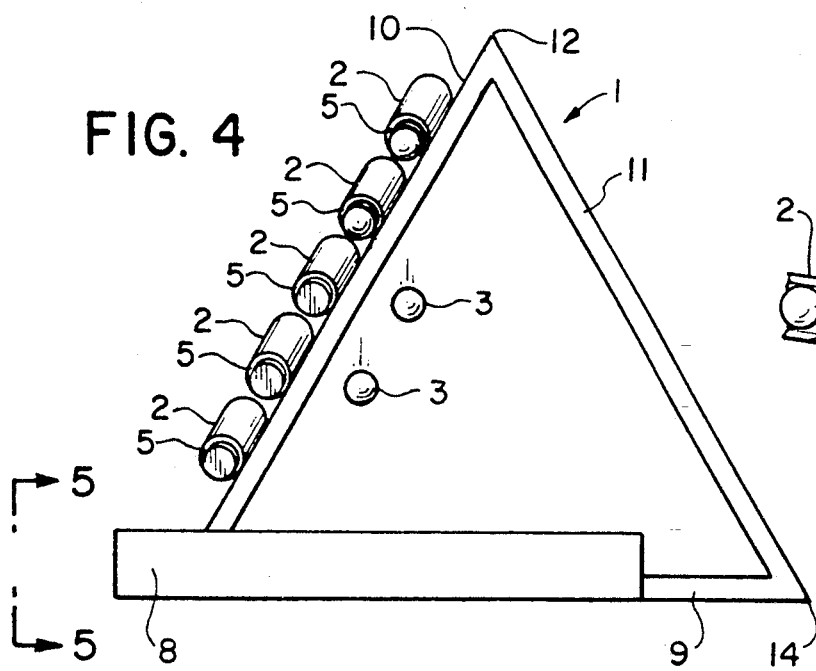 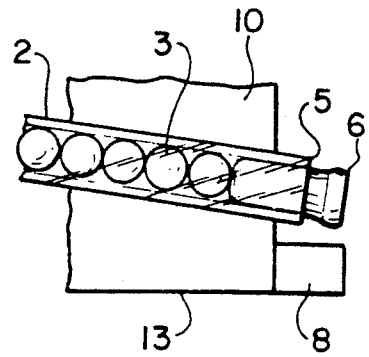

EDUCATIONAL TOY

FIELD OF THE INVENTION

The present invention relates to an educational toy, particularly for teaching a plurality of early development skills.

BACKGROUND OF THE INVENTION

U.S. Pat. No. 2,946,135 to Eickmeyer et al discloses an educational device comprising a plurality of slideways for receiving cards. The slideways are arranged in superimposed vertical-spaced relation. According to U.S. Pat. No. 2,946,135 the device enables a student to match numbers with number words, match pictures with picture name words, perform simple addition, subtraction, and multiplication, and to associate words. However, this device does not provide the dynamics or fun associated with toys having flowable balls.

Educational toys utilizing moveable balls are disclosed in U.S. Pat. No. 1,329,850 to Pye, U.S. Pat. No. 2,543,380 to Rivers, and U.S. Pat. No. 4,772,240 to Boskovic. In the device of U.S. Pat. No. 1,329,850, beads are threaded onto a string which is then attached to a flat board. Rearrangement of the beads requires disassembly of the device. U.S. Pat. No. 2,543,380 discloses a complicated device for passing balls through a runway and then into a plurality of channels. A multicompartment sorting toy is disclosed in U.S. Pat. No. 4,772,240. In this device, a plurality of colored or otherwise identifiable balls are sorted by the user through apertures until all balls of one type or alignment are located in each of the compartments.

The present invention provides an educational toy which is compact, sturdy, simple and inexpensive to construct. The device utilizes flowable balls to teach a variety of concepts such as up-and-down, left-and-right relationships, part-whole relationships and number and color awareness. It provides a means for developing counting skills and hand-eye coordination.

SUMMARY OF THE INVENTION

The present invention provides an educational toy which utilizes flowable balls, preferably marbles, to teach the concepts of left versus right, up versus down, while improving hand-eye coordination. It can be used to teach part-whole relationships, numbers, and color awareness. It can provide first steps toward developing counting skills and movement concepts.

The educational toy of the present invention comprises a base with transparent tubular members attached to it. The tubes are arranged in a generally parallel relationship to each other. The output end of each tubular member is mounted on the base so that it is lower than the input end of the tubular member. Accordingly, balls inserted in the input end flow to the output end. The tubular members are inclined, for example, at an angle of about 5° to about 30° to the horizontal to promote flow of the balls to the output end. Removable means, such as rubber stoppers or corks, are placed in the tubes at their output ends for retaining the balls within the tubular members. In a preferred embodiment, a receptacle is attached to the base for receiving the balls as they flow out of the tubes upon removal of the stoppers.

The tubular members are preferably arranged on the base so that the balls, upon flowing from the tubular member, do not fall upon any tubular members located below it. This may be accomplished, for example, by using tubular members of different lengths, such that the output end of the next higher tube is further laterally displaced in the direction of flow through the tube than the remaining tubes below it. In a preferred embodiment, the tubes are substantially the same length and end in about the same vertical plane but are displaced from each other in a vertical direction and in a horizontal direction. Such an arrangement may be provided by the use of a prismatic-shaped base.

In an embodiment of the invention, each tubular member may be cut at or adjacent its outlet end to provide an outlet orifice so that the balls drop from the tubular members in a substantially vertical path into receptacle means. In a preferred embodiment, the outlet orifice is cut so that the balls will drop from the tubular members without having to completely remove the stopper means from the tubes.

In embodiments of the present invention, the tubular members and the base, or at least one side of the base, may be integral. In such embodiments, the educational toy may be produced by extrusion.

BRIEF DESCRIPTION OF THE DRAWINGS

FIG. 1 is a perspective view of an educational toy in accordance with the present invention.

FIG. 2 is a cross-sectional view of a tubular member having its output end cut at an angle.

FIG. 3 is a cross-sectional view of a stoppered tubular member having an orifice adjacent its outlet end, the tubular member being cut so that balls may drop upon partial removal of the stopper.

FIG. 4 is an outlet end view of the educational device of the present invention.

FIG. 5 is a partial view taken in direction 5—5 in FIG. 4, showing the optional receptacle means attached to the base.

DETAILED DESCRIPTION OF THE INVENTION

In the present invention, the user develops hand-eye coordination by inserting balls within tubes and by inserting and partly or completely removing stoppers or plugs within the tubes. Part-whole relationships, counting, sorting and color awareness may be taught by using different numbers of balls and different colored balls in each tube. Up/down principles may be taught using the vertical arrangement of horizontally-oriented tubes. Gravitational movement and principles of left/right may be taught using the inclination in the tubes to cause the balls to flow from one end of the tube to another.

As shown in FIG. 1, a plurality of tubular members (2) are attached to base (1) in a manner so that the output end (5) of each tubular member (2) is lower than the input end (4) of each tubular member (2) so that the balls (3) inserted in the input ends (4) flow to the output ends (5) when the base (1) is standing or supported on a horizontal surface.

The tubes are preferably arranged in a generally parallel relationship to each other and preferably each of the output ends (5) terminate within the same vertical plane. The output ends (5) preferably terminate beyond the end of the base (1) so as to facilitate removal of stoppers (6) from the output ends (5) of the tubular members (2).

The tubular members (2) may be made from flexible or rigid transparent plastic materials. Flexible tubing is preferred. The tubular members are preferably straight, but they may also be curved along their longitudinal axes. The tubular members may be attached to the base (1) by nails (7) or screws, at a plurality of locations along their length. Attachment may also be accomplished by gluing of the tubes (2) to the base (1).

To promote flow of the balls (3) from the input end (4) to the output end (5) the tubular members (2) may, for example, be inclined at an angle of about 5° to about 30° to the horizontal. The tubular members (2) may be attached to the base (1) so that a portion of the output ends (5) are at one end of the base (1) and the other portion is at the opposing end of the base (1).

The tubular members (2) are internally configured to pass balls (3) therethrough. The balls (3) are preferably marbles. Exemplary of individually removable means (6) which may be used for retaining the balls (3) within the tubular members (2) are rubber stoppers and corks. An optional receptable means (8) may be attached to the base (1) for receiving the balls (3) upon removal of the stoppers (6).

The base (1) is preferably prismatic in shape as shown in FIG. 1. It may be hollow or solid. Use of a hollow configuration as shown in FIG. 1 provides a lighter toy and a space which may be used to store the balls (3). In embodiments of the present invention, the receptacle means (8) may extend into the hollow portion of the base (1). As shown in FIG. 1, the base (1) has a triangular cross-section formed by bottom (9) and opposing sides (10) and (11). The tubular members (2) may be attached to one or both of the opposing sides (10) and (11).

The base (1) may have cross-sections other than triangular, such as square, rectangular, hemispherical, or trapezoidal. A triangular cross-section is preferred.

As shown in FIGS. 1 and 4, opposing sides (10) and (11) have a top edge (12) which is generally parallel to bottom edges (13) and (14). The longitudinal axes of each tubular member (2) is inclined with respect to the edges (12) and (13). In embodiments of the present invention, the bottom edges (13) and (14) of the opposing sides (10) and (11) may be inclined at an angle to the top edge (12) of sides (10) and (11). The angle may be such so that the tubular members (2) are inclined at an angle of about 5° to about 30° to the horizontal when the bottom edges (13) and (14) are substantially horizontally oriented.

As shown in FIG. 2, the tubular members (2) may be provided with an output end (5) which is cut at an angle to the longitudinal axis (15) of the tube (2). The angle is such so as to provide an orifice (16) which is within a plane so that the balls (3) drop in a substantially vertical path upon outward displacement of the retaining means (6) from the tubular members (2).

In the embodiment shown in FIG. 3, the tubular member (2) is cut adjacent its output end (5) to provide an outlet orifice (17) so that the balls (3) drop from the tubular member (2) upon partial removal of the removable means (6). In this embodiment, complete removal of the stoppers (6) from the tubular members (2) is not necessary for removal of the balls (3).

The cross-section of the tubular members (2) is preferably circular, but other cross-sections, such as square, rectangular, or hemispherical may be used.

In preferred embodiments of the present invention, each tubular member (2) is arranged on the base (1) so that the balls (3) upon flowing from the tubular members (2) do not fall upon any tubular members (2) located below them, as illustrated in FIG. 4. Taking into account the backward slant of the side (10) from edge (13) to edge (12), the tubular members (2) are spaced one above the other so that the output end (5) is not directly above the output end (5) of any other tubular member (2).

As shown in FIGS. 4 and 5, the balls (3) fall into optional receptacle (8) upon removal of the stoppers (6). The receptacle (8) may extend partially or completely across the width of the base (9). If the tubular members (2) are attached to both opposing sides (10) and (11) the receptacle (8) would preferably extend past edge (14) of the base (1).

The tubular members (2) and the base (1) may be produced as an integral unit by extrusion. In alternative embodiments, the tubular members (2) and one or more of the opposing sides (10) and (11) may be integral and produced by extrusion or molding.

The base (1) may be made of wood, plastic, or metal. The base (1) may be made from one piece or separate pieces, such as a bottom (9) and two opposing sides (10) and (11) which are attached by nailing, gluing or screwing.

In embodiments of the present invention where a receptacle (8) is not attached to the base (1) the balls (3) may be collected in a cup or can held at the edge of a table, for example.

In embodiments of the present invention, the tubular members (2) may end at increasingly further distances along the length of side (10) for example, so that the outlet orifice of each tubular member (2) emits balls (3) at different locations along the length of the side (10) without the balls (3) falling upon any tubular members (2) located below.

What is claimed is:

1. An educational toy comprising:
   (a) a base,
   (b) transparent tubular members attached to said base and arranged in a generally parallel relationship to each other, said tubular members having an input end and an output end, and being internally configured to pass balls therethrough, the output end of each tubular member being lower than the input end of each tubular member so that balls inserted in the input end flow to said output end, and
   (c) a plurality of individually removable means which are individually removable from the output ends of said tubular members for retaining said balls within and removing said balls from said tubular members.

2. An educational toy as claimed in claim 1 wherein each output end is cut at an angle to the longitudinal axis of each tubular member to provide an orifice which is within a plane so that upon outward displacement of said retaining means from said tubular members, the balls drop in a substantially vertical path.

3. An educational toy as claimed in claim 1 wherein each tubular member is cut adjacent its outlet end to provide an outlet orifice so that the balls drop from the tubular members upon partial removal of said removable means.

4. An educational toy as claimed in claim 1 wherein each tubular member is arranged on said base so that the balls, upon flowing from the tubular members, do not fall upon a tubular member located below it.

5. An educational toy as claimed in claim 1 further comprising receptable means attached to said base for receiving balls from said output ends.

6. An educational toy as claimed in claim 1 wherein said tubular members and said base are integral.

7. An educational toy as claimed in claim 6 which is extruded.

8. An educational toy as claimed in claim 1 wherein said output ends terminate beyond the end of the base so as to facilitate removal of said removable means.

9. An educational toy as claimed in claim 1 wherein said removable means are rubber stoppers or corks.

10. An educational toy comprising:
   a) a base,
   b) transparent tubular members attached to said base and arranged in a generally parallel relationship to each other, said tubular members having an input end and an output end, and being internally configured to pass balls therethrough, the output end of each tubular member being lower than the input end of each tubular member so that balls inserted in the input end flow to said output end, and
   c) removable means at the output ends of said tubular members for retaining said balls within and removing said balls from said tubular members,
wherein said base comprises a bottom and two opposing sides which form a prismatic shape with said bottom, and said tubular members are attached to at least one of said opposing sides.

11. An educational toy as claimed in claim 10 wherein said tubular members are inclined at an angle of about 5° to about 30° to the horizontal.

12. An educational toy as claimed in claim 11 wherein each of said opposing sides comprises a top edge and a bottom edge and the bottom edges of each side are at an angle to the top edge of each side so that said tubular members are inclined at an angle of about 5° to about 30° to the horizontal when said bottom edges are horizontally oriented.

13. An educational toy as claimed in claim 10 wherein said tubular members and at least one of said opposing sides are integral.

14. An educational toy as claimed in claim 13 which is extruded.

15. An educational toy as claimed in claim 10 wherein said tubular members are attached to both of said opposing sides.

16. An educational toy as claimed in claim 10 wherein said output ends terminate beyond the end of the base so as to facilitate removal of the removable means.

17. An educational toy as claimed in claim 10 wherein a portion of the output ends are at one end of the base and the remaining portion is at the opposing end of the base.

18. An educational toy as claimed in claim 10 wherein each output end is cut at an angle to the longitudinal axis of each tubular member to provide an orifice which is within a plane so that upon outward displacement of said retaining means from said tubular members, the balls drop in a substantially vertical path.

19. An educational toy as claimed in claim 10 wherein each tubular member is cut adjacent its outlet end to provide an outlet orifice so that the balls drop from the tubular members upon partial removal of said removable means.

20. An educational toy as claimed in claim 10 wherein each tubular member is arranged on said base so that the balls, upon flowing from the tubular members, do not fall upon a tubular member located below it.

* * * * *